J. H. WALKER.
TROLLEY.
APPLICATION FILED JULY 7, 1910.
1,029,408.
Patented June 11, 1912.
2 SHEETS—SHEET 1.
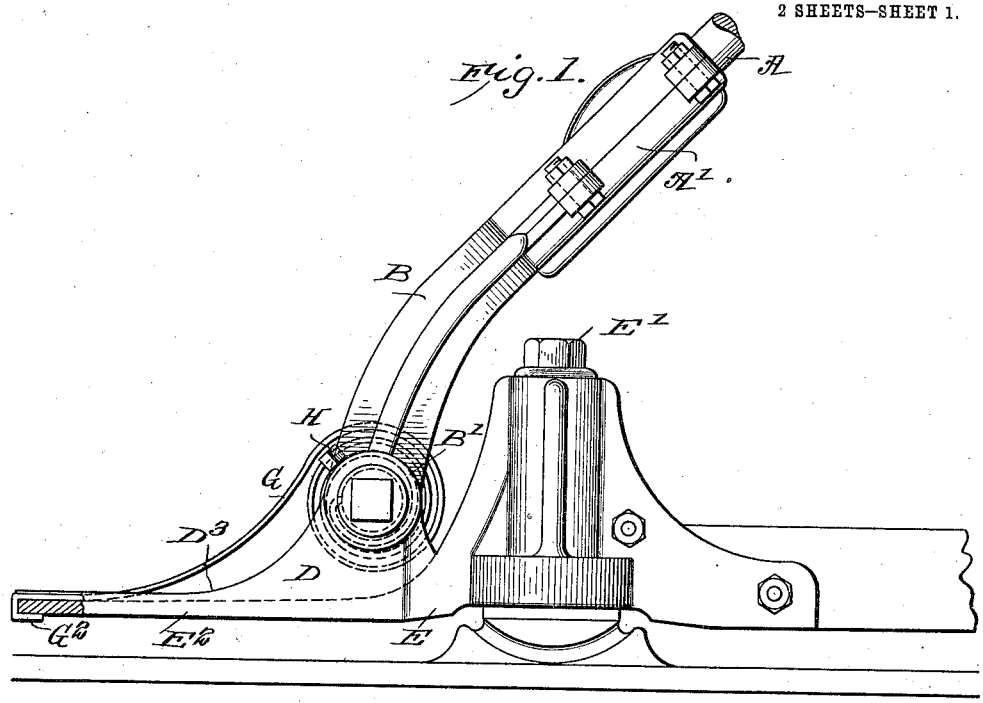
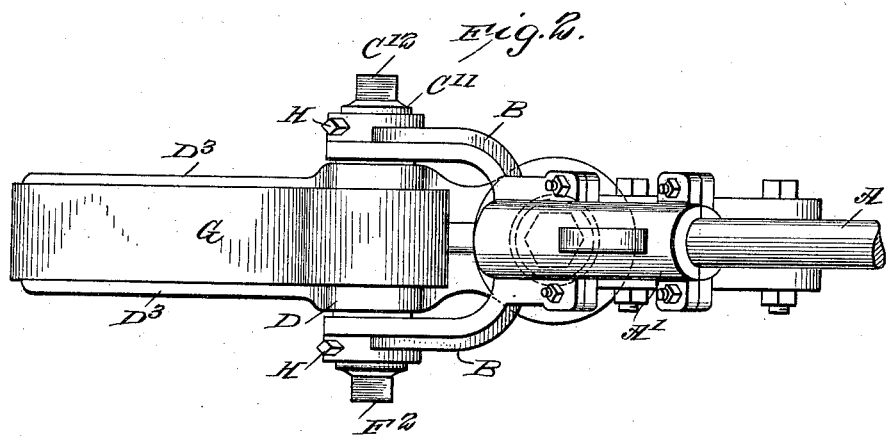
WITNESSES:
E. M. Callaghan
Perry B. Turpin
INVENTOR
JOHN H. WALKER
BY Munn & Co.
ATTORNEYS J. H. WALKER.
TROLLEY.
APPLICATION FILED JULY 7, 1910.
1,029,408.
Patented June 11, 1912.
2 SHEETS—SHEET 2.
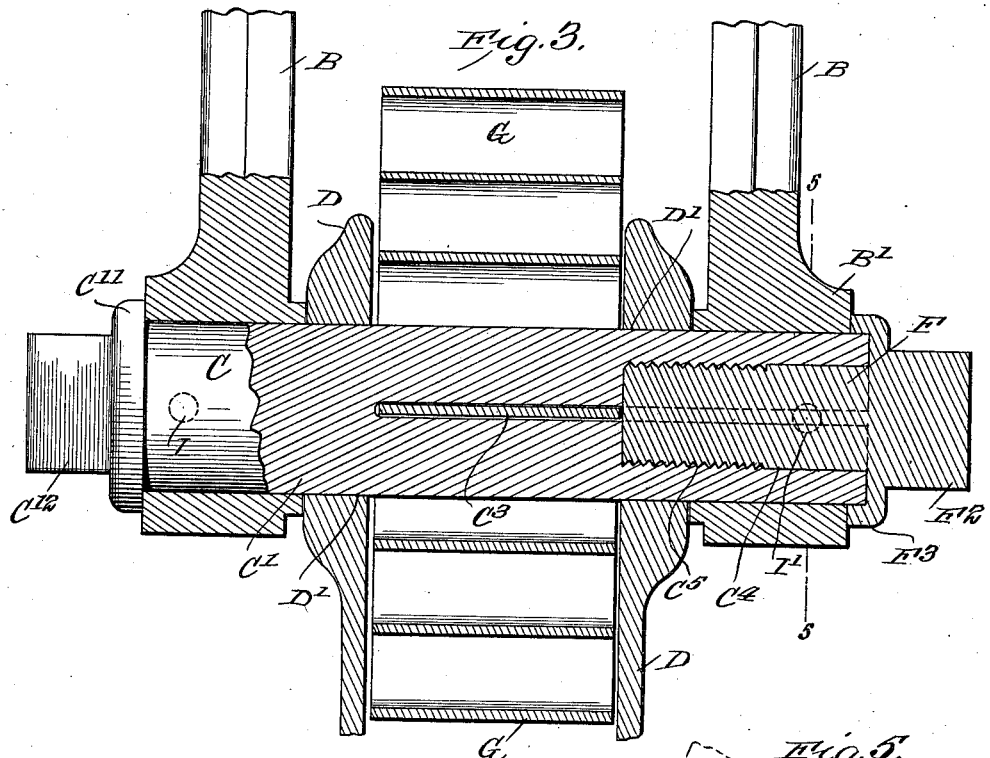
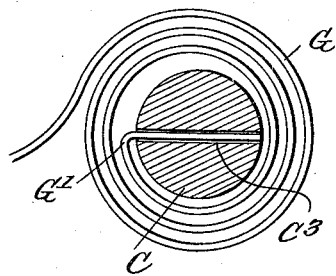
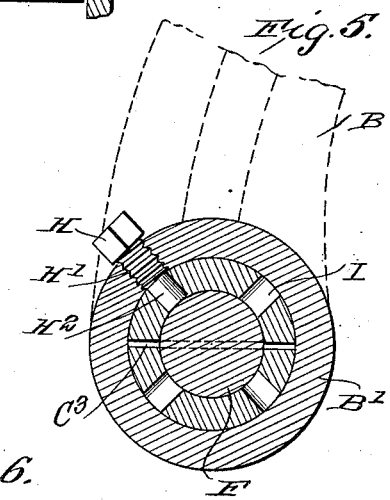
WITNESSES:
E. M. Callaghan
Perry B. Turpin
INVENTOR
John H. Walker
BY Munn & Co.
ATTORNEYS

UNITED STATES PATENT OFFICE.

JOHN H. WALKER, OF LEXINGTON, KENTUCKY.

TROLLEY.

1,029,408.  Specification of Letters Patent.  Patented June 11, 1912.

Application filed July 7, 1910. Serial No. 570,791.

*To all whom it may concern:*

Be it known that I, JOHN H. WALKER, a citizen of the United States, and a resident of Lexington, in the county of Fayette and State of Kentucky, have invented certain new and useful Improvements in Trolleys, of which the following is a specification.

This invention is an improvement in trolleys for electric cars and relates especially to the spring devices for holding the trolley pole up in such manner as to press its trolley against the conductor wire; and the invention has for an object to provide a novel form of tension spring for trolley poles in the nature of a flat spring, as well as to provide novel means of securing said spring to the pivot pin of the trolley pole as well as to the base plate of the turn-table; and the invention consists in certain novel constructions and combinations of parts as will be hereinafter described and claimed.

In the drawings Figure 1 is a side elevation, partly in section, and Fig. 2 is a top plan view of a trolley pole embodying my invention. Fig. 3 is a sectional elevation illustrating the pivot pin and the parts immediately associated therewith. Fig. 4 is a detail cross-section through the pivot pin, a portion of the spring being shown in side view. Fig. 5 is a detail section on about line 5—5 of Fig. 3. Fig. 6 is a detail perspective view of the threaded stud.

In the construction shown, the pole A is clamped at A' to its prongs B which prongs are provided with bearings B' which receive and encircle the pivot pin C to which the said bearings of the prongs are secured, as more fully described hereinafter. The pin C turns in bearings D' in the bearing lugs D projecting upwardly from the turntable plate E, which latter is pivoted vertically at E' so the trolley can swing from end to end of the car. The pin C turns freely in its bearings D' in the lugs D and the pin is of a special construction, being formed with a body or main section C' and the threaded stud F, as best shown in Fig. 3 of the drawings.

The body C' has a head $C^{11}$ at one end with an angular portion $C^{12}$, while the other end of the said body portion is socketed at $C^4$ with the base of the socket threaded at $C^5$ to receive the threaded portion F' of the stud F.

The socketed end of the pivot pin is slotted longitudinally and the said slot $C^3$ extends past the middle portion of the pin so that the portion of the pin C lying between the lugs D on the turn-table or base plate, will be slotted and will receive the bent end G' of the flat spring G, which spring G fits between the lugs D, usually occupying practically all of the space between the said lugs and manifestly this spring may be of any suitable width, the lugs D being correspondingly spaced, in order to secure the desired length and tension of the spring.

The threaded stud F screws into the socket $C^4$ of the main section of the pivot pin and has at its outer end an angular portion $F^2$ similar to the part $C^{12}$ of the main portion of the pin and the threaded stud F also has a cupped flange $F^3$ which receives the split or slotted end of the main section of the pin so that when the parts are assembled as shown in Figs. 1, 2 and 3, the cupped flange $F^3$ of the threaded stud will prevent any spreading of the slotted end of the pin within its bearing D', which might result in undue friction.

The base plate E of the turn table has an extension $E^2$ projecting beyond the pivot pin C and the lugs D are prolonged, see Figs. 1 and 2, and form at $D^3$ keeper flanges on opposite sides of the spring plate D, thus aiding in retaining the said spring in its proper relation to the base plate and the end of the spring G is bent at $G^2$ under and into connection with the end of the base plate $E^2$, as best shown in Fig. 1 of the drawing.

The bearing portions B' of the prongs are provided with threaded openings H' for the screws H and the body of the pin has at I and I' sockets into which the point $H^2$ of the screw may project when the parts are assembled, as shown in Figs. 1, 2 and 5 of the drawings. The openings I' at the slotted end of the pin permit the screws H at such end of the pin to be turned in to bear against the threaded stud F in such manner as to lock the said stud in its position in the socket $C^5$ of the pin. The threaded heads $F^2$ and $C^{12}$ permit the turning of the pivot pin, when the screws H are released, to coil or uncoil the spring plate and vary the tension thereof, said angular heads being adapted to receive large wrenches which will be useful for the purpose of adjusting the tension of the spring and when the tension of the spring is adjusted, the parts can be held in the adjusted position by inserting the screws H before described.

In carrying out my invention, it will be noticed that I provide an extension on the turn-table and provide on the turn-table the bearing lugs for the pivot pin which lugs are extended along the said extension and form guides or keepers for the spring plate, which spring plate is held at one end to the base plate or turn-table and at its other end to the pivot pin, this connection of the spring plate with the pivot pin being conveniently secured by the slotted form of the pin and the threaded stud applied as before described.

The turn-table may preferably be of cast steel, although malleable cast iron will also be found useful for the purpose.

An important feature of my invention is the flat spring plate coiled as described as this construction affords a simple, durable spring which can be utilized in connection with a very few parts so that it can be quickly applied and removed and can be furnished at a small cost.

Manifestly the flat spring plate may be made of any desired width or thickness to meet the required strain in holding up the trolley pole and at the same time be sufficiently flexible to yield in pulling down the trolley pole and adjusting the trolley to high and low conduit wires. At the same time the spring has a sufficient excess of sectional area to meet any exigencies that may result from various causes, such for instance as a lack of proper temper in the metal of the spring, the general conditions of the weather, flaws in the metal, etc. It will also be understood that the straining of the fiber of the spring metal longitudinally around the slotted pin increases the durability of the spring in actual service over the ordinary spiral spring. In further explaining this feature of my invention, it should be understood that if the spiral springs ordinarily used were made with an excess of sectional area to meet the required strains caused by the depression of the trolley pole and to meet defects, flaws, etc., in the metal, such springs would be so stiff and rigid from the thickness of the metal that they would not possess the resiliency necessary in a spring support for a trolley pole. For this reason, the broad thin flat spring is found of especial advantage for the purpose in view, as it can be made of proper tension to yield under light or heavy pressure and will still retain its elasticity notwithstanding the excess of sectional area which may be provided to overcome the defects, etc., as before referred to.

I claim:—

1. The combination of a base plate having an extension provided with lugs having bearings, a pivot pin fitting in said bearings and comprising a main section having an angular portion at one end and slotted from its opposite end and provided in said slotted end with a threaded socket, a threaded stud screwing in said socket and having a cupped flange receiving the slotted end of the main portion of the pin, the pole prongs encircling the pin alongside the lugs of the base plate, means for securing the prongs rigidly to the pivot pin, and a flat coiled spring held at one end in the slot of the pivot pin and wound spirally around said pin and held at its other end to the base plate, substantially as set forth.

2. In a trolley pole support, the combination of a turn table having its base plate extended and provided on said base plate with bearing lugs extending along the extension of the base plate, forming a groove or recess for a spring plate, the prongs lapping alongside the lugs of the turn table, a pivot pin extending through the prongs and lugs and having a body portion socketed in one end and slotted longitudinally from said end and a threaded stud screwing in said socket, and a flat spiral spring wound around the pivot pin between the lugs of the turn table and held at one end in the slot of the said pivot pin and having its other end bent into engagement with the edge of the base plate, substantially as set forth.

3. The combination of a trolley pole, a two part pivot pin therefor having its main portion slotted longitudinally and its other portion cupped to encircle and prevent the spreading of the split portion and a flat plate spring held at one end in the slot of the pivot pin and coiled around the latter, substantially as set forth.

4. The combination of a pivot pin composed of a main portion and a threaded stud, the main portion being socketed in one end and slotted longitudinally from said end and the stud being screwed in the socket of the main portion and having means engaging with the slotted end thereof for preventing the spreading of such end, lugs having bearings in which the pivot pin may be turned, the trolley pole having its prongs provided with bearings in which the pin may be turned, means for holding the pin from turning in the prongs of the pole and a spring coiled around the pivot pin and held at one end in the slot thereof, substantially as set forth.

5. The combination with a base plate having bearings for a pivot stud and an extension beyond the same, of the trolley pole, a pivot pin in the bearings of the base plate and a flat plate spring having one end bent into connection with the edge of the base plate, the other end of the spring being coiled around and secured to the pivot pin, substantially as set forth.

6. A base plate having bearings for a pivot pin and an extension beyond the same and having its extension grooved in its upper face, a pivot pin, a trolley pole having its prongs held to the pivot pin and a flat plate spring bent at one end into connection with the edge of the base plate and seated in the groove in the upper face of said plate and having its other end coiled around and secured to the pivot pin, substantially as set forth.

7. The combination with a trolley pole having prongs, of a pivot pin therefor and composed of a main portion having a threaded socket in one end and slotted longitudinally from said end and a threaded stud screwing in the socket of the main portion and having a cupped flange fitting over the slotted end of the main portion, a support having bearing lugs for the pivot pin arranged between the prongs of the pole and a flat plate spring held at one end in the slot of the pivot pin and coiled around said pin and suitably held at its other end, substantially as set forth.

JOHN H. WALKER.

Witnesses:
 SOLON C. KEMON,
 PERRY B. TURPIN.

Copies of this patent may be obtained for five cents each, by addressing the " Commissioner of Patents, Washington, D. C."